Figure 1:
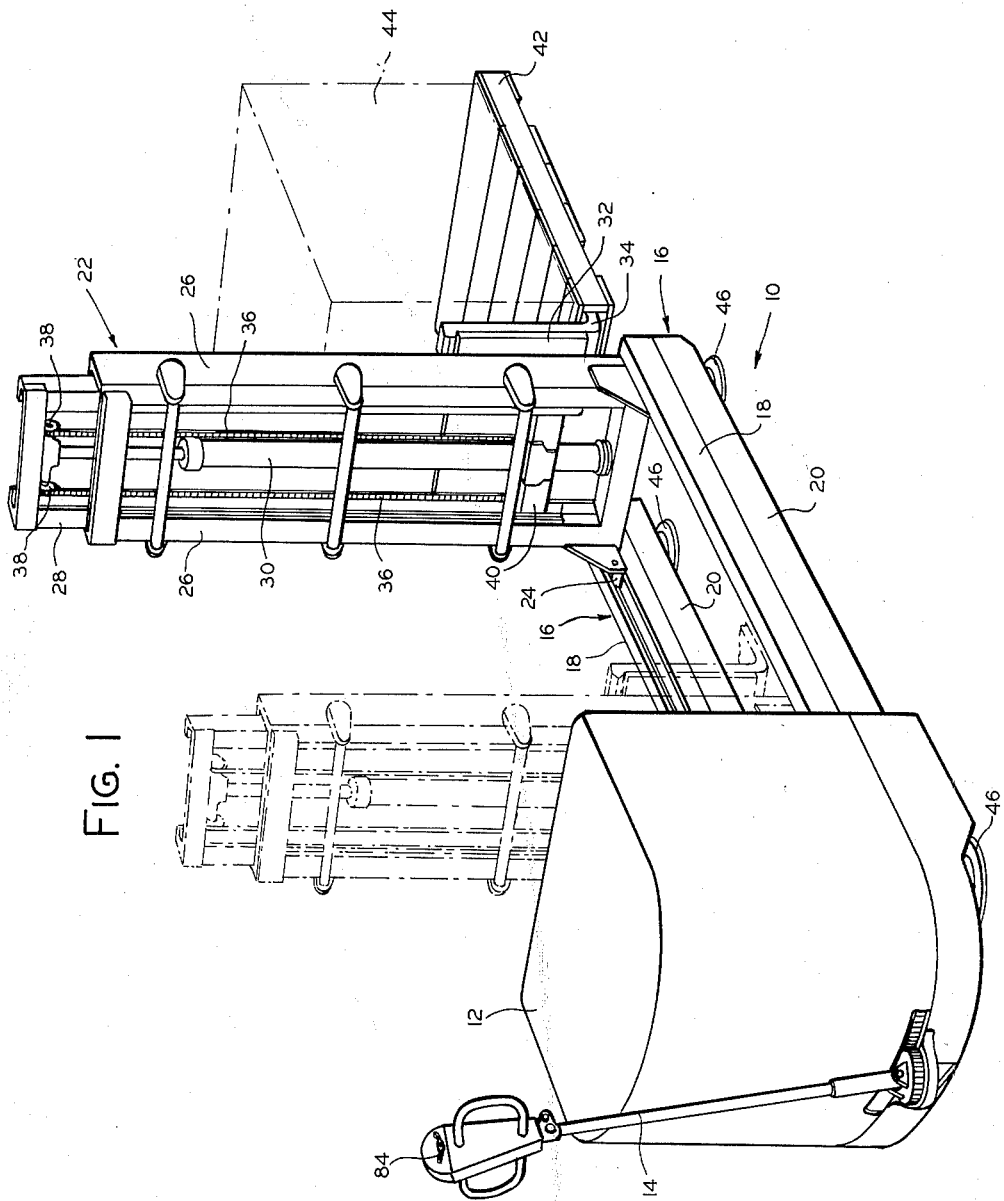

Aug. 24, 1965  C. B. ROGERS  3,202,232
AIR FILM VEHICLE
Filed May 9, 1962  6 Sheets-Sheet 1

INVENTOR
CYRIL B. ROGERS
BY *Kenneth C. Witt*
ATTORNEY

Aug. 24, 1965　　　C. B. ROGERS　　　3,202,232
AIR FILM VEHICLE
Filed May 9, 1962　　　　　　　　　　　　6 Sheets-Sheet 2
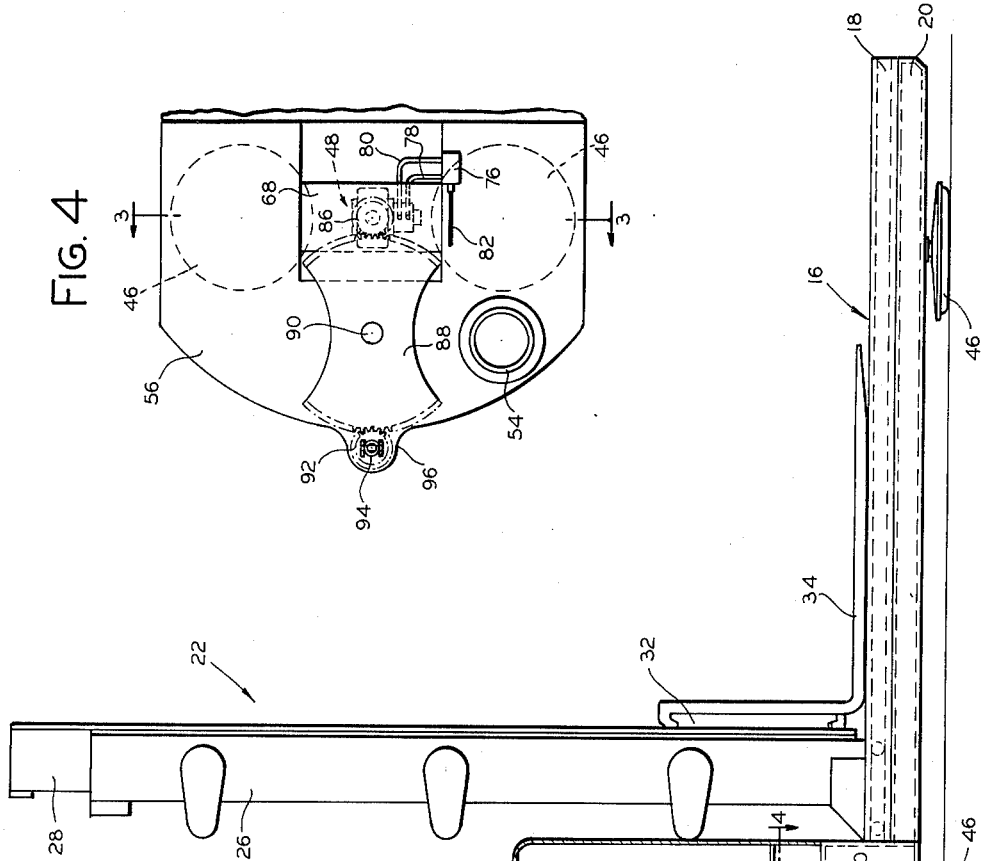
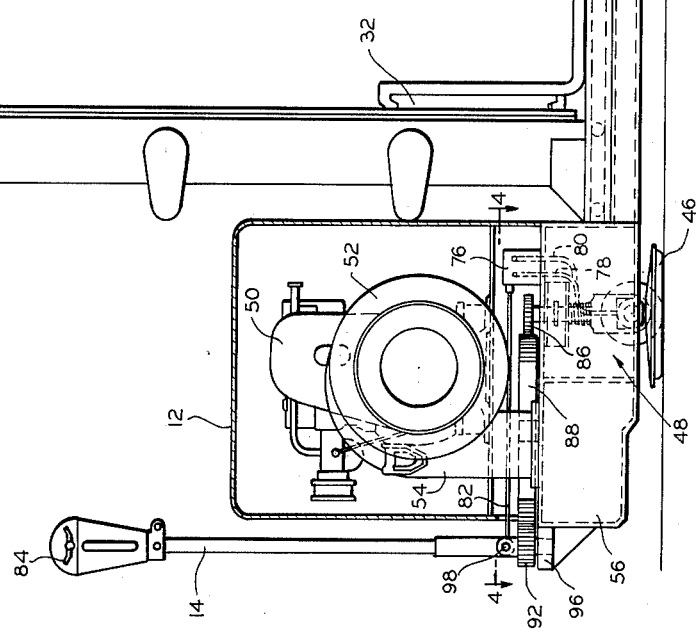
INVENTOR
CYRIL B. ROGERS
BY
Kenneth C. Witt
ATTORNEY Aug. 24, 1965

C. B. ROGERS 3,202,232

AIR FILM VEHICLE

Filed May 9, 1962

6 Sheets-Sheet 3

INVENTOR
CYRIL B. ROGERS
BY
*Kenneth C. Witt*
ATTORNEY

INVENTOR
CYRIL B. ROGERS
BY Kenneth C. Witt
ATTORNEY

Aug. 24, 1965
C. B. ROGERS
3,202,232
AIR FILM VEHICLE
Filed May 9, 1962
6 Sheets-Sheet 5
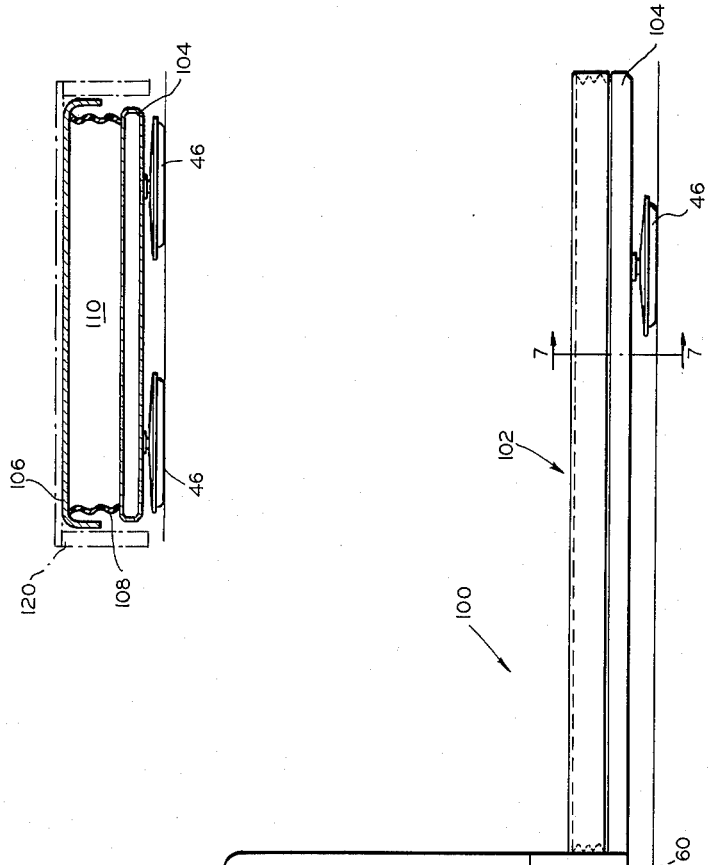
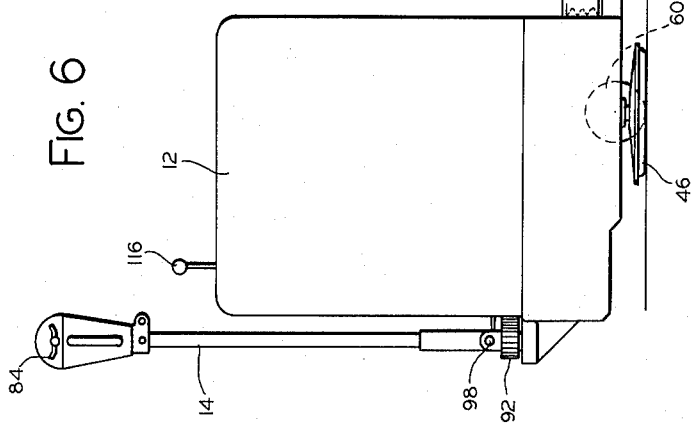
INVENTOR
CYRIL B. ROGERS
BY Kenneth C. Witt
ATTORNEY

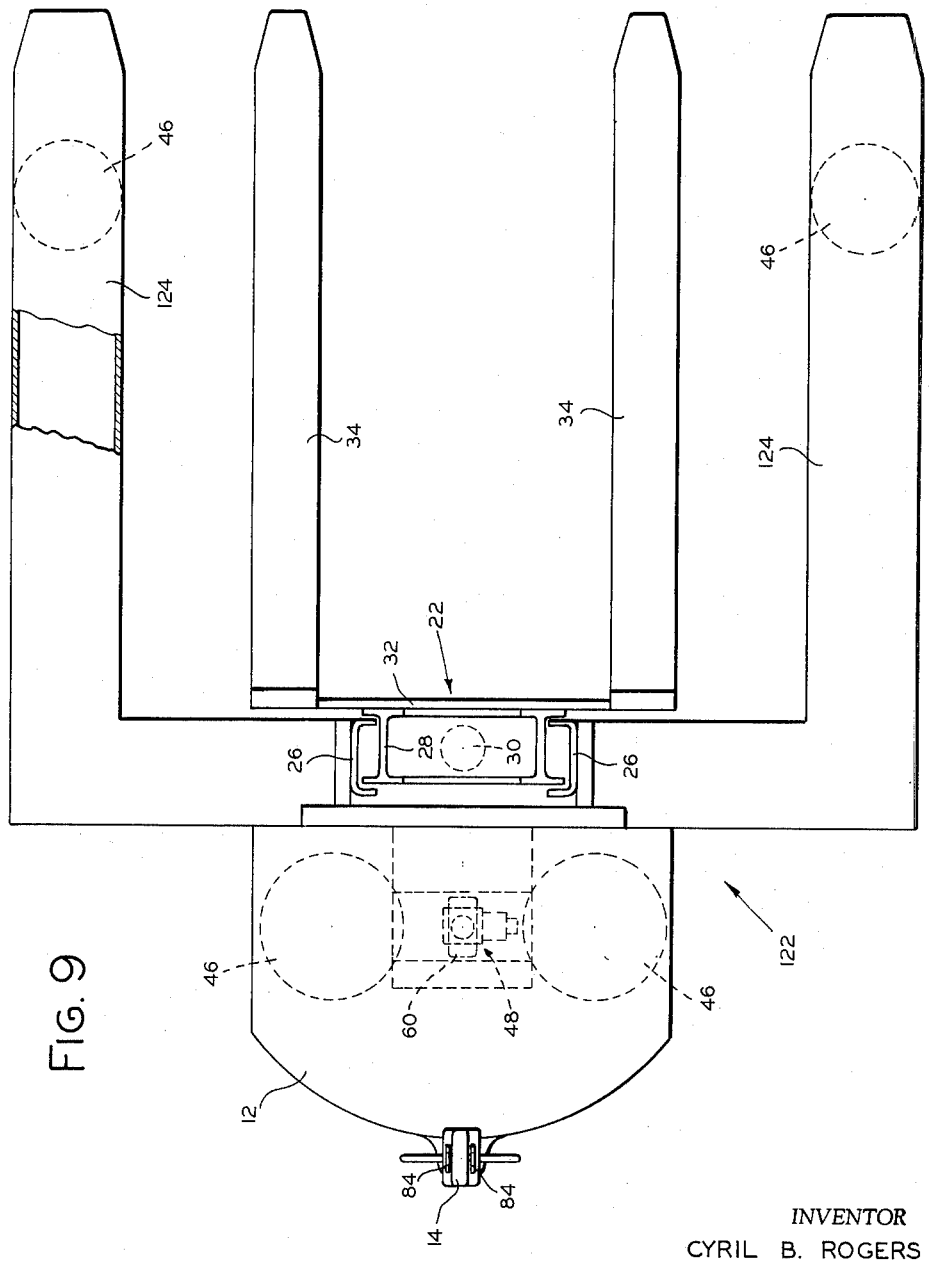

United States Patent Office 3,202,232
Patented Aug. 24, 1965

3,202,232
AIR FILM VEHICLE
Cyril B. Rogers, Battle Creek, Mich., assignor to Clark
Equipment Company, a corporation of Michigan
Filed May 9, 1962, Ser. No. 193,515
7 Claims. (Cl. 180—7)

This invention relates to vehicles, and more specifically to a self-propelled ground vehicle which utilizes a film of air as the medium which provides for movement of the vehicle instead of wheels, runners, endless tracks or other conventional means for ground vehicles.

This vehicle should be distinguished from the so-called ground effect machines which are supported several inches or more above the ground, water or other supporting surface by means of large volumes of air which are directed downwardly onto the supporting surface by suitable fans or blowers in the vehicle. The present vehicle utilizes merely a thin film of air as a lubricant to greatly reduce friction between the vehicle and the supporting surface so that the vehicle is enabled to move readily across the supporting surface without the presence of wheels or other conventional friction reducing means.

The object of this invention is to provide an air film vehicle as described, and especially a vehicle which is adaptable for the handling of materials in a manner similar to conventional fork trucks, towing tractors and other material handling vehicles.

In carrying out my invention in one preferred embodiment I provide a vehicle having a body portion to which is secured a forwardly extensible and retractable lift mast or upright structure. Air discharging pads or casters are attached to the bottom of the vehicle body to support it and provide an air film which serves as a lubricant between the air casters and the supporting surface. The vehicle is propelled and steered by means of a powered wheel mounted in the body portions and resiliently biased into contact with the ground or other supporting surface.

In another preferred embodiment of my invention I provide a load engaging platform under which is disposed an inflatable air lift, which may take the form of a bellows. Inflation and deflation of the air bellows causes the platform to raise and lower slightly, respectively, in order to raise a load off the ground or deposit it thereon.

Another preferred embodiment of my invention is similar to the first embodiment, except that the lift mast structure is not extensible and retractable and there is provided a pair of outrigger arms which extend forwardly of the vehicle and straddle the load engaged by the fork device which operates on the mast structure.

Figure 3:
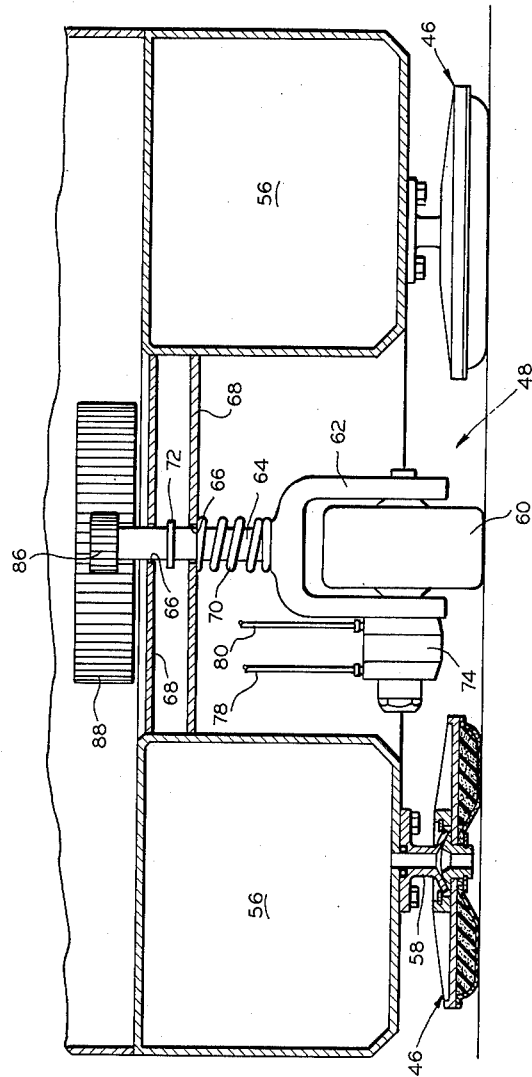
Figure 5:
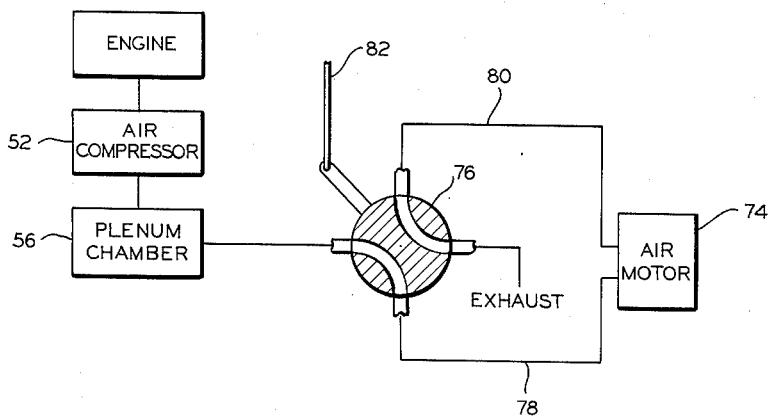
Figure 8:
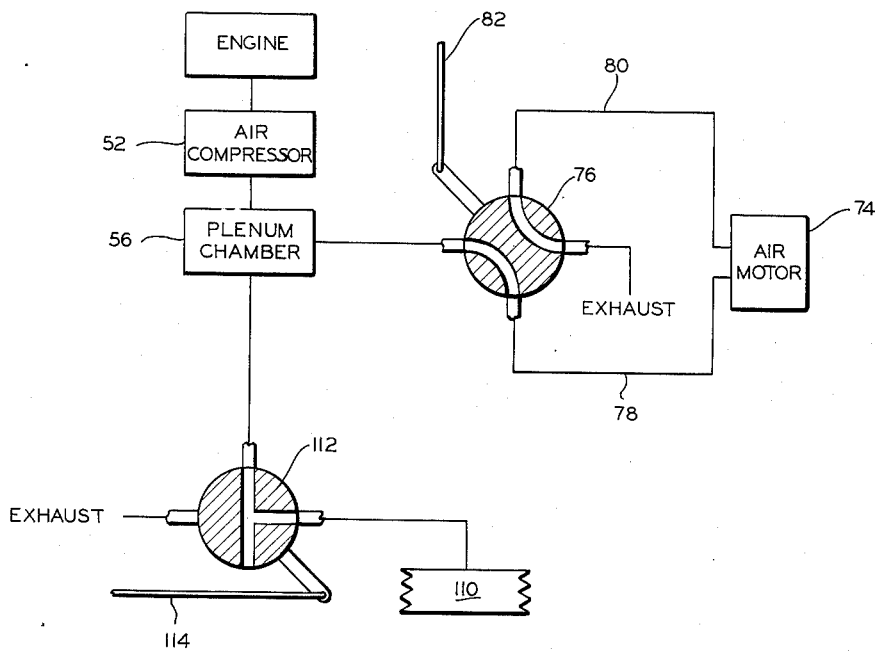

The above and other objects, features and advantages of my invention will become more readily apparent to one skilled in the art when the following detailed description is taken in conjunction with the drawing wherein:

FIGURE 1 is a perspective view of the first embodiment of my invention mentioned above, FIGURE 2 is a side elevation of the vehicle of FIG. 1 with a portion of the cover for the body portion removed, FIGURE 3 is a fragmentary cross-section taken along the line 3—3 in FIG. 4, FIGURE 4 is a fragmentary horizontal section taken along the line 4—4 in FIG. 2, FIGURE 5 is a schematic diagram of the system for operating the air motor, FIGURE 6 is a side elevation of the second embodiment of my invention, FIGURE 7 is a cross-sectional view taken along line 7—7 in FIG. 6, FIGURE 8 is a schematic diagram of the system for operating the air motor and load engaging means of the embodiment shown in FIG. 6, and FIGURE 9 is another embodiment of my invention which includes a fixed mast and a pair of outrigger arms, which straddle the load being engaged.

Referring now to FIGS. 1 through 5, the reference numeral 10 denotes generally an air film vehicle according to this invention having a body portion 12 to which is secured a control handle 14 and which includes a pair of parallel, forwardly extending horizontal frame members 16. Each member 16 includes an inwardly facing U-shaped channel portion 18 and a hollow duct portion 20.

A lift mast or upright 22 is mounted on frame members 16 for reciprocal longitudinal movement therealong by means of a plurality of rollers 24 connected to the mast structure and arranged to roll along the insides of channel portions 18. The mast structure 22 may be actuated between the solid outline position and the dotted outline position shown in FIG. 1 by any suitable means, such as a screw and ball nut mechanism (not shown). Mast 22 includes a pair of laterally spaced upright members 26 between which is slidably disposed an inner slide 28. Inner slide 28 is connected to a piston and cylinder type fluid motor 30, extension of fluid motor 30 actuating inner slide 28 vertically upward and retraction of fluid motor 30 actuating inner slide 28 vertically downward. A carriage 32 which supports a pair of fork arms 34 (only one of which is visible) moves vertically along inner slide 28 and is operated by a pair of chains 36 which are reeved respectively over a pair of sprockets 38 mounted on inner slide 28 adjacent the top thereof and secured at their one ends to a cross brace 40 which extends between fixed upright members 26. The other ends of the chains are connected to carriage 32. Extension of fluid motor 30 causes inner slide 28 to raise and, at the same time, raise carriage 32 so that a pallet 42 which is engaged by forks 34 will be elevated along with a load 44 thereon. For the purpose of simplifying the drawing, the fluid circuitry for supplying fluid to fluid motor 30 has been omitted; however, it will be appreciated that fluid could be supplied to fluid motor 30 by any suitable means, such as a flexible conduit.

The vehicle 10 is supported by a plurality of disk-shaped air pads or air casters 46 secured to the underside of the vehicle body portion which function as combined support and air film furnishing means. Air at low pressure such as 5 to 15 pounds per square inch is discharged from each air caster 46 centrally of the bottom surface thereof and flows radially outwardly to provide a film of air which is on the order of 0.0015 to 0.0030 of an inch thick and acts as a lubricant between air casters 46 and the supporting surface, such as a relatively smooth warehouse floor.

Air film vehicle 10 also includes a dirigible powered wheel assembly 48 (FIGS. 2 and 3) located in the body portion 12.

The body portion 12 includes an internal combustion engine 50 which drives a centrifugal type air compressor 52 that supplies low pressure air through outlet 54 to a U-shaped (see FIG. 4) plenum chamber 56. Plenum chamber 56 is connected to duct portions 20 so that air from the plenum chamber is conveyed to air casters 46 attached to the bottom side of duct portions 20 as well as the air casters 46 attached to the bottom side of plenum chamber 56.

Each air caster 46 is connected to the vehicle, as illustrated in FIG. 3, by means of a universal connection having limited movement and including a hollow support member 58 which serves to conduct air from plenum chamber 56 or duct portion 20 to the underside of air caster 46, the air flowing radially outwardly from there to form an air film which functions as a friction reducing medium.

Wheel assembly 48 is disposed vertically in the space between the legs of plenum chamber 56. Wheel assembly 48 includes a wheel 60 which is rotatably mounted in a downwardly opening yoke 62 to which is connected a vertically extending shaft 64. Shaft 64 extends upwardly through a pair of vertically aligned openings 66 in a pair of vertically spaced support plates 68 that extend between the legs of plenum chamber 56. A helical spring 70 is carried on shaft 64 and disposed between yoke 62 and the lower support plate 68 so that wheel 60 tends to be resiliently biased into engagement with the ground or other surface over which the vehicle is operating. A snap ring 72 of larger diameter than openings 66 is secured to shaft 64 intermediate support plates 68 and functions as a stop to limit vertical upward and downward movement of wheel assembly 48. Wheel 60 is conveniently powered by means of an air motor 74 which is secured to yoke 62 and drivingly connected to wheel 60. While it is convenient to use an air motor since there is a source of pressurized air available it will be understood that any other suitable motor, such as hydraulic or electric, may be used to power wheel 60 if desired. Air motor 74 is connected to a control valve 76 (see FIG. 5) by means of conduits 78 and 80. Control valve 76 is operable to connect conduit 78 to plenum chamber 56 and connect conduit 80 to exhaust so that air motor 74 will operate in one direction, connect conduit 80 to plenum chamber 56 and connect conduit 78 to exhaust so that air motor 74 will operate in the opposite direction, or connect neither conduit to plenum chamber 56 so that air motor 74 will not be powered. Operation of valve 76 conveniently can be accomplished by means of a Bowden wire 82 which runs up through control handle 14 to a lever 84 (FIG. 2).

Secured to the top of shaft 74 is a spur gear 86 which meshes with a larger diameter spur gear portion 88 that is rotatably mounted at its center on a stub shaft 90. Disposed diametrically opposite gear 86 is another spur gear 92 which likewise meshes with gear 88. Spur gear 92 is secured to a stub shaft 94 which in turn is pivotally mounted in a bracket 96. Control handle 14 is connected to shaft 94 by means of a pin and bracket connection 98 so that it is pivotal about a horizontally extending axis. It will be seen that by swinging control handle 14 to one side of the other spur gear 92 may be rotated. Rotation of spur gear 92 causes rotation of gear portion 88 which in turn causes spur gear 86 to rotate in the same direction as gear 92 and to the same extent since gears 86 and 92 are of equal diameter. Rotation of gear 86, of course, rotates the entire wheel assembly 48. As a result, the steering of vehicle 10 is intuitive, that is, wheel 60 turns in the same direction as control handle 14 is turned, and also turns an equal amount.

To understand the operation of my invention, assume that engine 50 is operating to drive air compressor 52 to supply low pressure air to plenum chamber 56 so that an air film is provided by air casters 46 between them and the surface over which air casters 46 move. Further, assume that it is desired to pick up and transport a palletized load, such as shown in FIG. 1. With mast 22 in the forwardly extended position shown in solid outline in FIG. 1 and fork arms 34 in their lowered position the vehicle 10 is propelled forwardly by means of wheel 60 so that fork arms 34 are inserted into pallet 42. The lift mechanism is then actuated to raise the palletized load slightly so that it clears the top of frame members 16, and the mast is then moved rearwardly to the position shown in dotted outline in FIG. 1. The operator is now free to propel vehicle 10, along with the load, to the location to which it is desired to move the load by actuating lever 84 to control the direction of rotation of drive wheel 60, while steering the vehicle by turning control handle 14 in the direction in which it is desired to propel the vehicle.

Referring now to FIGS. 6, 7 and 8, there is disclosed an embodiment of my invention denoted generally by the numeral 100. Vehicle 100 differs from vehicle 10 only in the load engaging means, and so like reference numerals are used for like parts. The vehicle 100 has a platform type load lifting structure 102 extending forwardly from body portion 12. Structure 102 includes a hollow support member 104 which serves to support a lifting platform 106 and a flexible bellows member 108 which is disposed between the lifting platform and support member 104 and forms therewith an air chamber 110. In addition to functioning as a support, support member 104 also serves as a duct to communicate air from plenum chamber 56 to air casters 46 connected to the underside of member 104.

Air chamber 110 is connected to plenum chamber 56 by means of a control valve 112 (FIG. 8) so that pressurized air from plenum chamber 56 can be communicated to air chamber 110 to expand bellows 108 and thereby raise platform 106 or vented to exhaust so that bellows 108 will collapse and platform 106 will lower. Valve 112 may be actuated by means of a Bowden wire 114 which is connected to a conveniently placed control lever 116. While I prefer to utilize air from plenum chamber 56 to raise platform 106, it will be understood that such action could readily be accomplished by other mediums, such as oil.

In operation, vehicle 100 is maneuvered by an operator through the use of control handle 14 to turn wheel 60 and actuation of control lever 84 to control the direction of rotation of wheel 60 so that lifting member 102 is disposed beneath an elongated inverted U-shapel pallet 120. When lifting member 102 is disposed beneath the pallet 120 control lever 116 may be actuated to shift valve 112 to the position in FIG. 8 so that pressurized air from plenum chamber 56 is conducted into air chamber 110 causing platform 106 to raise and thereby lift pallet 120 free of the ground. The operator can now guide the vehicle 100 to the new location to which it is desired to transport pallet 120 by turning control handle 14 in the direction that it is desired to turn wheel 60 and by actuating lever 84 to control the direction of rotation of wheel 60. When pallet 120 is positioned in the new location, control lever 116 may be actuated by the operator to shift valve 112 so that air chamber 110 is now connected to exhaust with the result that pallet 120 is lowered onto the ground.

Referring to FIG. 9, there is shown another embodiment of my invention. This vehicle is denoted generally by reference numeral 122 and includes a body portion 12 identical to that shown in FIGS. 1 and 6. Secured to body portion 12 is a vertically disposed mast structure 22 which is identical to that shown in FIGS 1 and 2, except that it is not movable longitudinally of the vehicle. Only the fixed upright member 26, inner slide 28, carriage 32, fork arms 34 and the location of motor 30 have been shown in FIG. 9. It will be understood that various rollers, chains and braces have been omitted in order to simplify the figure.

The vehicle 122 also includes a pair of hollow outrigger arms 124 that define a space within which fork arms 34 are disposed. In addition to helping support vehicle 122 outrigger arms 124 also serve as ducts to convey pressurized air from plenum chamber 56 to air casters 46 which are secured to the underside of outrigger arms 124.

In operation, vehicle 122 is operated to approach a palletized load so that forks 34 are inserted into the pallet in a manner similar to that shown in FIG. 1. At the same time outrigger arms 124 straddle the pallet. After forks 34 are inserted into the pallet, the lift mechanism is actuated so that the pallet is lifted slightly off the ground. Then, the vehicle 122 can be propelled and guided to the new location by means of wheel assembly 48 at which place the pallet can be redeposited upon the ground, and the vehicle 122 backed away from the pallet to withdraw fork arms 34 from beneath it.

While I have disclosed three embodiments of my invention, it will be understood that the description is illustrative only, and should not be considered in a limiting sense. The limits of my invention should be determined from the following claims taken in the light of the prior art.

I claim:

1. In a material handling vehicle having a body portion and load engaging means secured to the body portion, combined support and air film lubrication means secured to the body portion for supporting the body portion on a supporting surface and providing a lubricating air film between the surface and said combined support and air film lubrication means, said combined support and air film lubrication means including a source of pressurized air, a U-shaped plenum chamber forming a part of the body portion and connected to said source of pressurized air, said plenum chamber defining a space between the legs and bight portion thereof, a dirigible powered wheel assembly disposed in said space and connected to the body portion for propelling and steering the vehicle, said assembly including a yoke, a substantially vertically extending shaft secured to said yoke and pivotally connected to the body portion for movement about a substantially vertical axis, a wheel rotatably journaled in said yoke, spring means for resiliently biasing said wheel into contact with the supporting surface, air motor means for driving said wheel, said air motor means being connected to said source of pressurized air, and means for controlling pivotal movement of said assembly about said vertical axis.

2. An air film vehicle comprising a body portion, a source of pressurized air carried by said body portion, a U-shaped plenum chamber forming a part of said body portion and connected to said source of pressurized air, said plenum chamber defining a space between the legs and bight portion thereof, a pair of plates extending across said space between said legs, a pair of vertically aligned annular openings in said plates, a dirigible powered wheel assembly disposed in said space and carried by said plates for pivotal movement about a substantially vertical axis, said assembly including a yoke, an upwardly extending shaft secured to said yoke at one end and passing upwardly through said openings, a snap ring secured to said shaft and disposed between said plates to limit vertical movement of said shaft, a wheel rotatably mounted within said yoke, a spring disposed between the lower one of said plates and said yoke for biasing said wheel downwardly into contact with a supporting surface, an air motor mounted on said yoke and drivingly connected to said wheel, said motor being connected to said plenum chamber to receive pressurized air therefrom, a gear secured to said shaft adjacent the upper end thereof, said gear being operatively connected to a control handle so that said control handle controls pivotal movement of said assembly about said vertical axis, and a plurality of air casters secured to said vehicle for supporting it on the supporting surface and providing an air film between the supporting surface and said casters, said casters being connected to said plenum chamber to receive pressurized air therefrom.

3. A vehicle as set forth in claim 2 wherein said body portion includes a pair of forwardly extending, parallel frame members, at least one air caster is mounted on each frame member, each frame member having a duct portion for conveying air from said plenum chamber to said air caster, and a mast structure having load engaging forks and mounted on said frame members for reciprocal movement between a position adjacent one end of said frame members and a position adjacent the other end of said frame members.

4. A vehicle as set forth in claim 2 including load engaging means having a horizontally extending hollow support structure secured to said body portion and communicating with said plenum chamber, said support structure having at least one air caster secured thereto and supplied with pressurized air from said plenum chamber through said support structure, a platform disposed above said support structure, a bellows member disposed between said support structure and said platform and forming therewith an air lifting chamber, and valve means for communicating said air lifting chamber alternatively with said plenum chamber or exhaust.

5. In a material handling vehicle having load engaging means and carrying a source of pressurized air, a body portion having a U-shaped plenum chamber connected to the source of pressurized air and a pair of hollow parallel outrigger arms which extend forwardly straddling said load engaging means, a plurality of air casters secured to said body portion for supporting it on the supporting surface and providing an air film between the supporting surface and said casters, each outrigger arm having at least one air caster secured thereto and serving as a duct for conveying air from said plenum chamber to the respective air caster, said plenum chamber defining a space between the legs and bight portion thereof, a pair of plates extending across said space between said legs, a pair of vertically aligned annular openings in said plates, and a dirigible powered wheel assembly disposed in said space and carried by said plates for pivotal movement about a substantially vertical axis, said assembly including a yoke, an upwardly extending shaft secured to said yoke at one end and passing upwardly through said openings, a snap ring secured to said shaft and disposed between said plates to limit vertical movement of said shaft, a wheel rotatably mounted within said yoke, a spring disposed between the lower one of said plates and said yoke for biasing said wheel downwardly into contact with the supporting surface, an air motor mounted on said yoke and drivingly connected to said wheel, said motor being connected to said plenum chamber to receive pressurized air therefrom, a gear secured to said shaft adjacent the upper end thereof, said gear being operatively connected to a control handle so that said control handle controls pivotal movement of said assembly about said vertical axis.

6. An air film vehicle comprising a body portion having a pair of forwardly extending, parallel frame members, a plurality of air casters secured to said body portion for supporting said body portion on a supporting surface and providing an air film between said casters and the supporting surface, at least one air caster being mounted on each frame member, a source of pressurized air carried by the vehicle, means for conveying air from said source to said air casters including a duct portion in each frame member for conveying air to the air caster mounted on the respective frame member, a mast structure having load engaging means and mounted on said frame members for reciprocal movement between a position adjacent one end of said frame members and a position adjacent the other end of said frame members, a wheel mounted on the vehicle and resiliently biased into contact with the supporting surface, and an air motor for driving said wheel, said air motor being connected to said source of pressurized air.

7. An air film vehicle comprising a body portion, a source of pressurized air carried by the vehicle, at least one air caster connected to said source of pressurized air and secured to said body portion for supporting said body portion on a supporting surface and providing an air film between said caster and the supporting surface, a wheel mounted on the vehicle and resiliently biased into contact with the supporting surface, an air motor for driving said wheel connected to said source of pressurized air, and load engaging means having a horizontally extending hollow support structure secured to said body portion and communicating with said source of pressurized air, said support structure having at least one air caster secured thereto and supplied with pressurized air from said source of pressurized air through said support structure, a platform disposed above said support structure, a bellows member disposed between said support structure and said platform and forming therewith an air lifting chamber, and valve means for communicating said air lifting chamber alternatively with said source of pressurized air or exhaust.

References Cited by the Examiner

UNITED STATES PATENTS

| | | | |
|---|---|---|---|
| 2,364,676 | 12/44 | Warner. | |
| 2,667,985 | 2/54 | Woughter | 214—670 |
| 2,989,202 | 6/61 | De Canniere | 214—670 |
| 3,019,930 | 2/62 | Allen | 214—731 |
| 3,052,483 | 9/62 | Petersen | 180—7 X |
| 3,119,598 | 1/64 | Petersen et al. | 180—7 |

FOREIGN PATENTS

| | | |
|---|---|---|
| 9,011 | 1915 | Great Britain. |
| 878,818 | 6/59 | Great Britain. |
| 1,093,804 | 11/54 | France. |
| 1,238,499 | 7/60 | France. |

A. HARRY LEVY, *Primary Examiner.*

MORRIS TEMIN, PHILIP ARNOLD, *Examiners.*